Jan. 19, 1932. H. C. BOWEN 1,841,354
VALVE
Filed Nov. 21, 1928

Inventor:
Herbert C. Bowen
By Williams, Bradbury, McCaleb & Hinkle
Attys.

Patented Jan. 19, 1932

1,841,354

UNITED STATES PATENT OFFICE

HERBERT C. BOWEN, OF DETROIT, MICHIGAN, ASSIGNOR TO HYDRAULIC BRAKE COMPANY, OF LOS ANGELES, CALIFORNIA, A CORPORATION OF CALIFORNIA

VALVE

Application filed November 21, 1928. Serial No. 320,824.

This invention relates to improvements in valves used in the master cylinder of hydraulic brake systems wherein said valve is actuated by the movement of a piston mounted within the cylinder to regulate the pressure within fluid pressure lines and interconnected wheel cylinders. The valve further operates to control the flow of liquid brake fluid from and to the master cylinder upon the compression and suction strokes of the piston mounted therein.

The action and position of the device is disclosed in the patent issued to Malcolm Loughead and Irwin T. Loweke, No. 1758671, dated May 13, 1930, and, while the valve structure therein is patentably different from that herein disclosed, it functions in the same manner.

An object of the invention is to provide a valve that is simple in construction and one which will be economical to manufacture.

The valve used at present in hydraulic brake master cylinders is expensive to manufacture and, inasmuch as the parts are made entirely of metal, the manufacture and assembly thereof is a costly proceeding whereas the valve disclosed herein is extremely simple in construction and economical to manufacture yet will function just as efficiently as the metal valves heretofore used in master cylinders.

Other objects and advantages of the invention will appear as the description proceeds.

Figure 1:
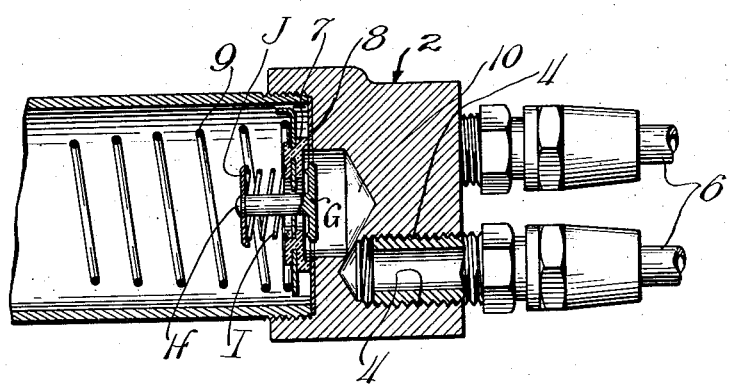
Fig. 1 is a fragmentary view, partially in section and partially in plan, of a master cylinder in a hydraulic brake system with my invention mounted therein.
Figure 3:
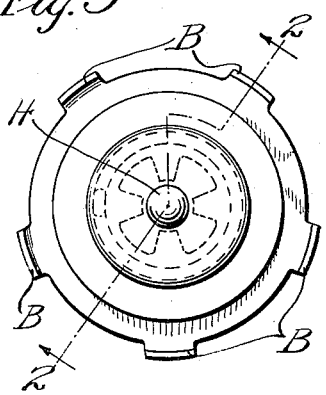
Fig. 3 is a plan view taken on the left side of Fig. 2.
Figure 2:
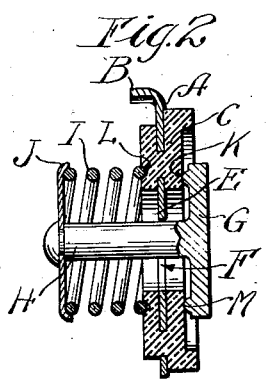
Fig. 2 is a longitudinal, sectional view of the valve structure which is the subject of my invention.
Figure 4:
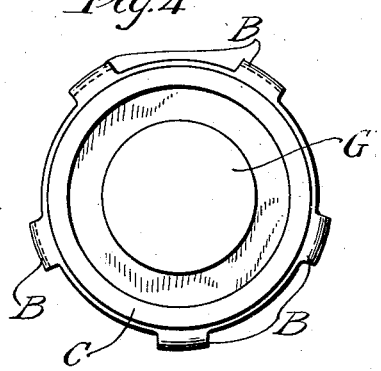
Fig. 4 is a plan view taken on the right side of Fig. 2.
Figure 5:
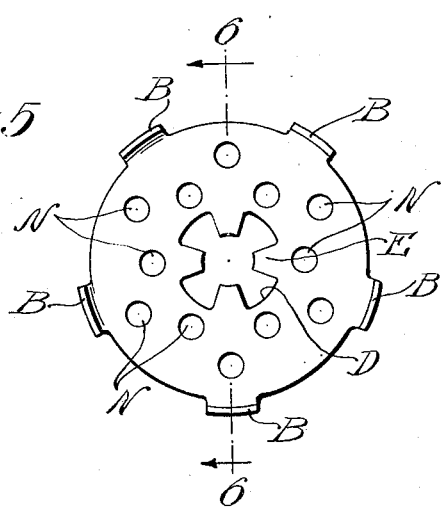
Fig. 5 is a plan view of the base plate of my valve structure.
Figure 6:
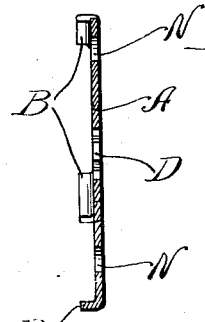
Fig. 6 is a sectional view along the line 6—6 of Fig. 5.

In the preferred construction of my invention, 1 indicates a master cylinder within which is mounted a piston, not shown, actuating liquid brake fluid ahead of said piston, thereby transmitting pressure to wheel cylinders and pistons which, in turn, operate the brakes of the vehicle to which the system is attached. The numeral 2 indicates the closure head for the master cylinder in the end of which are threaded passages 4 wherein fluid pressure pipes 6 are mounted. The fluid pressure pipes 6 inter-connect the master cylinder with the wheel cylinders. A valve 7 is mounted in the end of the master cylinder adjacent the closure member 2 and bearing upon a shoulder 8 formed therein. It is normally held firmly against said shoulder by a compression spring 9, the opposite end of which bears against the inner head of a piston not shown. The valve 7 is kept in alignment with aperture 10 in closure member 2 inasmuch as the diameter of the circular base member is approximately that of the interior diameter of the master cylinder.

Heretofore I have described the valve structure which is the subject of my invention in its relation to the master cylinder. Independently it consists of metallic base member A having lugs B extending from the outer periphery thereof which are upturned at an angle of 90° to form a seat for the spring 9. The base member A is perforated as at N to provide apertures through which liquid rubber or other similar material may run when the valve member C is molded so that when the valve member C and the base member A are removed from the molding die said base member A will be firmly fixed in the valve.

In the manufacture of the base member A an axially positioned aperture D is punched therein, the cutting die being so formed as to leave lugs E extending inwardly from the periphery of the said aperture D. When the valve member C is molded about the base member A the mold is so constructed as to leave a smooth axially located passage F having the metallic lugs E extending therein. Lugs E form guides for the stem H of a valve G. A compression spring I surrounds said stem and is compressed between the valve member C and a metallic spring seat J fixed to the inner end of the valve stem H by overturning the end of the stem which passes through an axially located aperture in said spring seat. The spring is positioned around the valve stem H between the valve member C and the spring seat J under compression which normally holds the valve G against the valve seat K, thus closing the passage F. The valve seat K is formed in the face of the valve member C in the forming die, the forming die also being so constructed as to form an axial groove L in which the spring I seats. In the manufacture of the valve head G the under side thereof is milled or pressed to form an axially extending rib M which is adapted to engage the valve seat K, thus forming a tight seal when the valve is in a closed position.

As may be readily seen from the above description and drawings, the valve is double acting. On the compression stroke of the piston the valve head G will be forced away from its seat against the tension of the spring I and the brake fluid will pass through the passage F into the fluid pressure lines. On the retraction stroke of the piston the valve member C will be forced away from its seat in the shoulder 8 against the tension of the spring 9 permitting liquid to escape from the fluid pressure lines therearound, whereas the valve G will remain in a closed position.

The pressure at which valve C operates depends upon its size in relation to the size of the piston. The effective size of valve C is the area included by shoulder 8. This area is so related to the size of the piston that when a lower than atmospheric pressure exists within the piston, atmospheric pressure will force the piston forwardly with sufficient force to maintain a pressure of about ten pounds per square inch in the pressure lines. This pressure in the fluid lines is independent of the strength of the spring 9 since the stronger the spring the greater will be the suction in the cylinder tending to unseat the valve.

Having described the nature of the embodiments of my invention, what I desire to secure by Letters Patent is:

1. A device of the character described including a resilient valve member, a reinforcing disc imbedded in said resilient member, a central opening in said disc and a valve mounted therein, means for holding said valve seated against said resilient valve member and radially disposed lugs of said disc extending into said central opening for guiding said valve.

2. A device of the character described including a resilient valve member, a reinforcing disc imbedded in said resilient member, a central opening in said disc, integrally formed radially disposed lugs of said disc extending into said opening to form guide means for an axially movable valve mounted therein and means for holding said valve seated against a seat of said resilient valve member.

3. A device of the character described including a valve member, a reinforcing disc imbedded in said resilient member, a central orifice in said valve member and an aligned orifice in said disc to form a port, lugs integral with said disc extending radially into said port to form guide means for an axially movable valve and means for holding said valve seated against a seat in said resilient member to close said port.

4. A device of the character described including a resilient valve member provided with a central opening, a reinforcing disc imbedded therein and a central opening in the same in alignment with the opening in said resilient valve member to form a port, a cylinder for receiving said resilient valve member, a spring for forcing said resilient member against the end of said cylinder to close said inlet port, lugs extending from the periphery of said disc to form a seat for said spring, lugs extending radially from the periphery of the central opening in said disc to form guide means for a valve mounted centrally in said outlet port and spring means for forcing said valve against a seat in said valve member to close said outlet port.

5. A device of the character described comprising a resilient valve member, a reinforcing disc embedded therein, a cylinder for receiving said valve member, radially disposed means extending from the periphery of the disc providing a seat for spring means in the cylinder, said spring means yieldingly maintaining the valve member against a seat in the cylinder end and an inlet port in the end thereof closed by said valve member, aligned apertures in the valve member and the reenforcing member, integrally formed lugs of said reenforcing disc radially disposed and projecting in the aperture of the same to form guide means for a valve mounted centrally in the resilient member and adapted to be held against a seat in said resilient member.

6. A device of the character described comprising a resilient valve member, a reenforcing disc embedded therein, a cylinder for receiving said valve member, angularly formed lugs integrally formed with said disc extending radially from the periphery of the same, spring means in the cylinder seated against said lugs for yieldingly maintaining the valve member against a seat in the cylinder end and an inlet port in the said end closed thereby, aligned apertures in said valve member and the reenforcing disc forming an outlet port, integrally formed lugs of said disc projecting into said outlet port and forming guide means for a valve mounted centrally in said outlet port and spring means for yieldingly holding said valve against a seat in said resilient member to close said outlet port.

In witness whereof, I hereunto subscribe my name this 15th day of November, 1928.

HERBERT C. BOWEN.